UNITED STATES PATENT OFFICE.

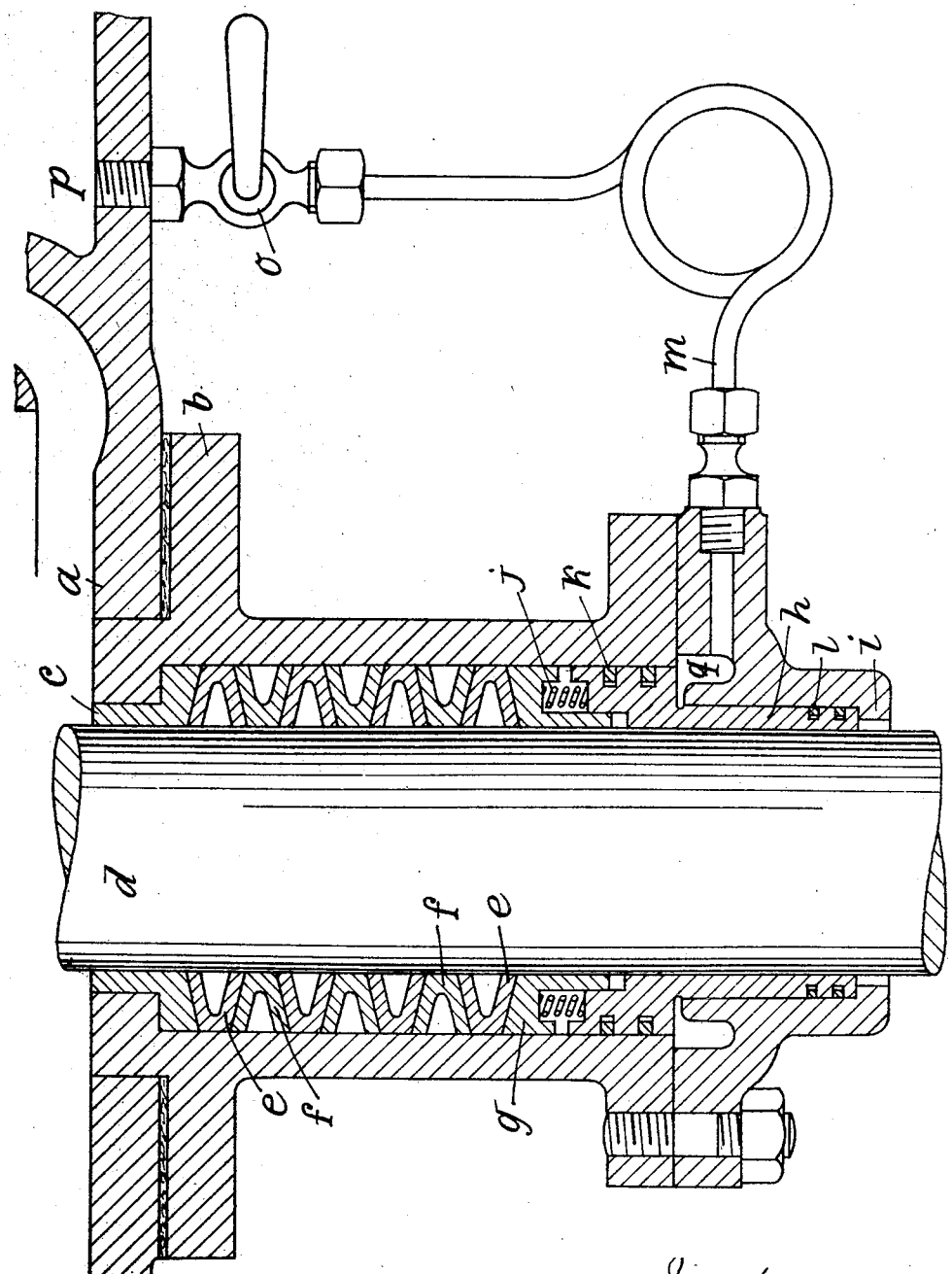

HENRIK ANATHOR-HENRIKSEN, OF KRISTIANSAND, NORWAY.

PACKING.

1,324,775.   Specification of Letters Patent.   Patented Dec. 16, 1919.

Application filed June 4, 1918. Serial No. 238,208.

*To all whom it may concern:*

Be it known that I, HENRIK ANATHOR-HENRIKSEN, a subject of the King of Norway, residing at Kristiansand, Norway, have invented certain new and useful Improvements in Packing; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a packing for piston rods and the like and chiefly consists therein that the packing is compressed by means of a piston arranged on the outside of the packing and actuated by a pressure fluid, so that it acts to compress the packing in the direction of the cylinder. The piston thus makes the use of tightening screws for the packing unnecessary.

On the drawing is illustrated a form of the invention by means of an axial section through the same. The packing illustrated on the drawing is adapted for use with a piston rod. The exterior packing sleeve $b$ is fastened to the cylinder bottom $a$. Near the inner end of the packing is located a bushing $c$, which serves as a guide for the piston rod $d$. The packing rings $e$ are suitably of a wedge-shaped cross section and are made hollow in order to be yielding. Each ring consists of eight parts and between each of the rings $e$ are located metal rings $f$ of similar form as the rings $e$ but arranged in opposite relation to the same, so that the broadest part of rings $f$ lies against the narrowest part of rings $e$. Said rings $f$ consists of eight separate parts.

Outside the last ring $e$ is located a ring $g$ the exterior surface of which is provided with recesses for take up springs $j$, the opposite ends of which press against an angular piston $h$ provided with packing rings $k$, $l$. In the cover $i$ of the packing box a channel $q$ is provided to which is conducted pressure fluid from a source of pressure $p$ for instance the slide chamber or the like through a tube $m$ with cock $o$.

When cock $o$ is opened the pressure from chamber $p$ will act from channel $q$ and press piston $h$ inward so that the same acts to compress packing rings $e$, $f$ tightening the same about piston rod $d$.

Claims.

1. A packing for piston rods comprising a sleeve, packing material therein, a cover for the sleeve having a bore smaller than the bore of the sleeve, a differential annular piston in sliding contact with the piston rod and fitting the sleeve and cover, and means to admit a pressure medium to the sleeve through the cover.

2. A packing for piston rods comprising a sleeve, packing material therein, a cover for the sleeve having an annular channel therein communicating with the sleeve, an annular piston in sliding contact with the piston rod and having an enlarged portion fitting the bore of the sleeve and a reduced portion fitting the bore of the cover, and means for supplying a pressure medium to the annular channel.

3. A packing for piston rods comprising a sleeve, a bushing for the rod in one end of the sleeve, a cover for said sleeve having an annular channel communicating with the sleeve, an annular piston in sliding contact with the piston rod and having an enlarged portion fitting the bore of the sleeve and a reduced portion fitting the bore of the cover, a ring in the sleeve between the piston and bushing, take-up springs between the ring and piston, and means to supply a pressure medium to the annular channel.

4. A packing for piston rods comprising a sleeve, a bushing for the rod in one end of the sleeve, a cover for said sleeve having an annular channel communicating with the sleeve, an annular piston in sliding contact with the piston rod and having an enlarged portion fitting the bore of the sleeve and a reduced portion fitting the bore of the cover, a ring in the sleeve between the piston and bushing, packing members wedge-shaped in cross section arranged between the ring and bushing, take-up springs mounted in recesses formed in the ring and engaging the inner end of the piston, and means to supply a pressure medium to the annular channel.

In testimony that I claim the foregoing as my invention, I have signed my name in presence of two subscribing witnesses.

HENRIK ANATHOR-HENRIKSEN.

Witnesses:
LUDVIG HAUGEN,
V. B. COX.